United States Patent
Culbertson

(10) Patent No.: US 6,373,977 B1
(45) Date of Patent: Apr. 16, 2002

(54) METHODS AND APPARATUS FOR CONSTRUCTING A 3D MODEL OF A SCENE AND RENDERING NEW VIEWS OF THE SCENE

(75) Inventor: W. Bruce Culbertson, Palo Alto, CA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/273,934

(22) Filed: Mar. 22, 1998

(51) Int. Cl.[7] .............................. G06K 9/00; G06K 9/36; G06K 9/38; G06T 17/00
(52) U.S. Cl. ...................... 382/154; 382/270; 382/285; 345/424
(58) Field of Search ................................. 382/154, 285, 382/128, 131, 172, 270; 345/424; 378/4; 700/98

(56) References Cited

U.S. PATENT DOCUMENTS 5,761,385 A * 6/1998 Quinn ........................ 706/20
6,215,892 B1 * 4/2001 Douglass et al. ........... 382/128
6,243,098 B1 * 6/2001 Lauer et al. ................. 345/424

OTHER PUBLICATIONS

Stytz et al, "Three–Dimensional Medical Imaging: Algorithms and Computer Systems", Dec. 1991, ACM Computing Surveys, vol. 23, No. 4, pp. 421–499.*

Wittenbrink et al, "Opacity–Weighted Color Interpolation for Volume Sampling", IEEE paper on volume visualization, Oct. 1998, pp. 135–142.*

K.Kutulakos et al, "A Theory of Shape by space Carving", Univ. of Rochester CS Technical Report #692, May 1998, pp. 1–27.

S. Seitz et al, "Photorealistic Scene Reconstruction by Voxel Coloring", In Proc. Computer Vision and Pattern Recognition Conf., pp. 1067–1073, 1997.

* cited by examiner

Primary Examiner—Amelia M. Au
Assistant Examiner—Mehrdad Dastouri

(57) ABSTRACT

A three-dimensional model of a scene is reconstructed from a plurality of images of the scene taken from different viewpoints. A set of voxels that include the scene is defined, and each of the voxels in the set of voxels is processed. Each voxel is projected onto a set of pixels in each of the images. A first color-standard-deviation of not-occluded pixels is determined across all images. A second color-standard-deviation of not-occluded pixels is determined for each individual image. A mean of the second color-standard-deviations is determined across all images. A coloring threshold that is a function of the mean is established. If the first color-standard-deviation is less than the coloring threshold, the voxel is colored. Otherwise, the voxel is left transparent. The coloring threshold is established adaptively and depends on the color variation across the projection of the voxel in each individual image.

11 Claims, 5 Drawing Sheets

```
K1 AND K2 ARE CONSTANTS

FOR ALL IMAGES       /* CLEAR OCCLUSION BITMAPS*/
    SET ALL PIXELS TO NOT-OCCLUDED

FOR EACH LAYER OF VOXELS ALONG MAJOR AXIS {
  FOR EACH VOXEL V IN LAYER {
    FOR EACH IMAGE i {
      FIND THE SET Pi OF PIXELS IN THE PROJECTION OF V
      FOR ALL PIXELS P IN Pi WHICH ARE NOT-OCCLUDED {
        ADD CONTRIBUTION OF P TO COLORMEAN
        ADD CONTRIBUTION OF P TO COLORSTDDEVALLIMAGES
        ADD CONTRIBUTION OF P TO COLORSTDDEVTHISIMAGE
      }
      ADD CONTRIBUTION OF COLORSTDDEVTHISIMAGE TO
           MEANSTDDEVINDIVIDUALIMAGES
    }
    THRESHOLD = K1* MEANSTDDEVINDIVIDUALIMAGES + K2
    IF (COLORSTDDEV < THRESHOLD) { /*IF COLORS MATCH...*/
      MARK V OPAQUE AND COLOR V WITH THE COLORMEAN
      FOR EACH IMAGE i
          SET PIXELS IN Pi TO OCCLUDED
    } ELSE MARK V TRANSPARENT    /*IF COLORS DO NOT MATCH...*/
  }
```

```
       FOR ALL IMAGES        /* CLEAR OCCLUSION BITMAPS*/
         SET ALL PIXELS TO NOT-OCCLUDED

FOR EACH LAYER OF VOXELS ALONG MAJOR AXIS {
  FOR EACH VOXEL V IN LAYER {
    FOR EACH IMAGE i {
      FIND THE SET P_i OF PIXELS IN THE PROJECTION OF V
      FOR ALL PIXELS OF P_i WHICH ARE NOT-OCCLUDED
        ADD CONTRIBUTION TO COLORMEAN AND COLORSTANDARDDEVIATION
    }
      IF (COLORSTANDARDDEVIATION < THRESHOLD) { /* IF COLORS MATCH..*/
        MARK V OPAQUE AND COLOR V WITH THE COLORMEAN
        FOR EACH IMAGE i
          SET PIXELS IN P_i TO OCCLUDED
      } ELSE MARK V TRANSPARENT       /*IF COLORS DO NOT MATCH..*/
  }
}
```

Fig. 2
PRIOR ART

```
K₁ AND K₂ ARE CONSTANTS

FOR ALL IMAGES        /* CLEAR OCCLUSION BITMAPS*/
    SET ALL PIXELS TO NOT-OCCLUDED

FOR EACH LAYER OF VOXELS ALONG MAJOR AXIS {
  FOR EACH VOXEL V IN LAYER {
    FOR EACH IMAGE i {
      FIND THE SET Pᵢ OF PIXELS IN THE PROJECTION OF V
      FOR ALL PIXELS P IN Pᵢ WHICH ARE NOT-OCCLUDED {
        ADD CONTRIBUTION OF P TO COLORMEAN
        ADD CONTRIBUTION OF P TO COLORSTDDEVALLIMAGES
        ADD CONTRIBUTION OF P TO COLORSTDDEVTHISIMAGE
    }
      ADD CONTRIBUTION OF COLORSTDDEVTHISIMAGE TO
          MEANSTDDEVINDIVIDUALIMAGES
  }
    THRESHOLD = K₁* MEANSTDDEVINDIVIDUALIMAGES + K₂
    IF (COLORSTDDEV < THRESHOLD) { /*IF COLORS MATCH..*/
      MARK V OPAQUE AND COLOR V WITH THE COLORMEAN
      FOR EACH IMAGE i
        SET PIXELS IN Pᵢ TO OCCLUDED
      } ELSE MARK V TRANSPARENT       /*IF COLORS DO NOT MATCH..*/
  }
```

Fig. 4

METHODS AND APPARATUS FOR CONSTRUCTING A 3D MODEL OF A SCENE AND RENDERING NEW VIEWS OF THE SCENE

FIELD OF THE INVENTION

This invention relates to methods for rendering new views of a scene from a set of input images of the scene and, more particularly, to an improved voxel coloring technique which utilizes an adaptive coloring threshold.

BACKGROUND OF THE INVENTION

Currently there is a great deal of interest in image-based rendering techniques. These methods draw from the fields of computer graphics, computer vision, image processing and photogrammetry. The goal of these methods is to compute new views from one or more images of a scene, be they natural or synthetic. Several images of a scene are acquired from different camera viewpoints. The image data is used to compute one or more images of the scene from viewpoints that are different from the camera viewpoints. These techniques may be referred to as "new view synthesis". A number of new view synthesis techniques have been disclosed in the prior art.

One new view synthesis technique, called "voxel coloring", is disclosed by S. Seitz et al. in "Photorealistic Scene Reconstruction by Voxel Coloring", *Proceedings Computer Vision and Pattern Recognition Conf.*, pp. 1067–1073, 1997. The voxel coloring method requires that the pose of the input images be known. This means that the location and orientation of each camera are known, which allows points in the scene to be projected into the images. Thus, for any point in the scene, it is possible to calculate corresponding points in the images.

Voxel coloring involves two steps. First, a three-dimensional model of the scene is built in a step called reconstruction. The model, also called a reconstruction, is composed of points called voxels (short for volume elements). A voxel can be transparent, in which case it represents an empty part of the scene, or it can be opaque and have a color, in which case it represents part of an object in the scene. In the second step, the three-dimensional model is rendered to create the new image.

To reconstruct a scene, the user first specifies the volume of discrete voxels that includes the scene of interest. The algorithm scans the volume one voxel at a time. The voxels are colored as follows. If a voxel projects into approximately the same color in all images, it is marked as opaque and is given the color of its projections. Otherwise, the voxel is left transparent. Specifically, a voxel is colored if the standard deviation of the colors of all the pixels in all the projections is less than a constant, called the coloring threshold. Physically, a voxel that is marked as opaque and is colored represents the surface of an object in a scene, whereas a transparent voxel represents an empty part of the scene.

The voxel coloring algorithm also deals with occlusions. A voxel is said to be occluded if the view of the voxel from a particular camera is blocked by another voxel that has been colored. The voxel coloring algorithm manages occlusion relationships by maintaining an occlusion bitmap for each image and by scanning away from the cameras. When a voxel is colored, occlusion bits are set for the pixels in the projections of the voxel. Rays from such pixels are blocked by the newly colored voxel and therefore do not reach the voxels that remain to be scanned. Consequently, during the remainder of the reconstruction, the algorithm ignores pixels that have become occluded.

The voxel coloring algorithm described above encounters a problem where a surface has a large, abrupt color variation, and at the edge of an object in the scene. The voxel in the reconstruction projects on the corresponding pixels with a high color standard deviation. A high color standard deviation occurs at the edge of an object, because some pixels in the projection of the voxel fall within the object and other pixels fall outside the object. The high color standard deviation is likely to exceed the coloring threshold, and the voxel is not colored for any reasonable coloring threshold. A threshold high enough to allow the edge to be colored ignores most detail elsewhere and results in a very distorted reconstruction. Worse, when the voxel is not colored, the occlusion bitmaps are not set, so no voxels can be colored further along the rays from the cameras through the voxel. Thus, errors propagate.

Accordingly, there is a need for improved methods and apparatus for reconstructing a three-dimensional model of a scene using voxel coloring, wherein one or more of the above drawbacks are overcome.

SUMMARY OF THE INVENTION

According to an aspect of the invention, methods and apparatus are provided for reconstructing a three-dimensional model of a scene from a plurality of images of the scene taken from different viewpoints. The method includes the steps of defining a set of voxels that include the scene, and processing the voxels in the set of voxels beginning with voxels that are closest to the viewpoints and progressing away from the viewpoints. The processing of each voxel proceeds as follows. The voxel is projected onto a set of pixels in each of the images. A first color variation of not-occluded pixels in the sets of pixels is determined across all images. In addition, a second color variation of not-occluded pixels if determined across the set of pixels for each individual image, and a mean of the second color variations is determined across all images. A coloring threshold that is a function of the mean is established. If the first color variation across all images is less than the coloring threshold, the voxel is colored. Otherwise, the voxel is left transparent. Thus, the coloring threshold is established adaptively and depends on the color variation across the set of pixels for each individual image.

The step of determining a first color variation may comprise determining a color standard deviation across the plurality of images. The step of determining a second color variation may comprise determining a color standard deviation for each individual image. The coloring threshold may be a linear function of the mean of the second color variations.

The processing of each voxel may further comprise setting bits in an occlusion bitmap corresponding to the sets of pixels in the plurality of images when the voxel is colored.

A color mean of the sets of pixels in the plurality of images may be determined. The step of coloring the voxel may comprise setting the voxel color to the color mean.

BRIEF DESCRIPTION OF THE DRAWINGS

For a better understanding of the present invention, reference is made to the accompanying drawings, which are incorporated herein by reference and in which:

FIG. 2 shows pseudo code for a prior art voxel coloring algorithm;

FIG. 4 shows pseudo code for a voxel coloring algorithm in accordance with an embodiment the present invention.

DETAILED DESCRIPTION

Figure 1:
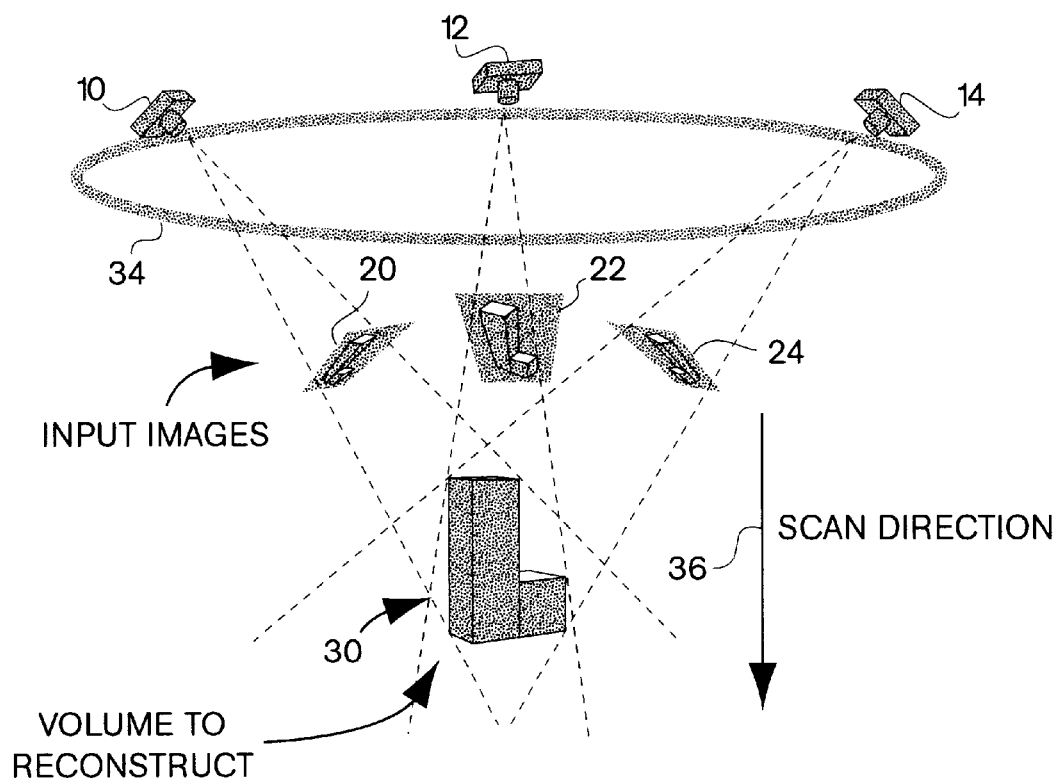
FIG. 1 is a perspective schematic illustration of the reconstruction of a three dimensional model of a scene using voxel coloring.

A schematic perspective diagram that illustrates reconstruction of a three-dimensional model of a scene using voxel coloring is shown in FIG. 1. Cameras 10, 12, 14 acquire respective input images 20, 22, 24 of a scene 30 from different camera viewpoints. Each of cameras 10, 12, 14 has an associated location and orientation when the respective images are acquired. In a preferred embodiment, cameras 10, 12, 14 are located in a plane 34 on one side of scene 30. In a more general configuration, all cameras are located on one side of a plane and all voxels in the scene volume are located on the other side of the plane. This configuration permits the voxel coloring algorithm to scan the voxels in a scene volume, starting with voxels that are closest to the camera viewpoints and progressing away from the camera viewpoints. As described below, this scanning direction facilitates management of occluded pixels. In a practical situation, 10–40 images of the scene may be acquired from different viewpoints. For a stationary scene, the images may be acquired with the same camera at different times.

As described above, input images 20, 22, 24 may be used to generate one or more new views, or images, of scene 30 from viewpoints that are different from the viewpoints of cameras 10, 12 and 14. The new view synthesis first requires reconstruction of a three-dimensional model of scene 30 from input images 20, 22 and 24. The three-dimensional model is then used to render one or more new images of scene 30. The improved voxel coloring algorithm of the present invention relates to reconstruction of a three-dimensional model of scene 30.

Pseudo code representing a prior art voxel coloring algorithm is shown in FIG. 2. Initially, occlusion bits for all pixels in all input images are set to not-occluded in corresponding occlusion bitmaps. A scene volume that includes the scene of interest is established. The scene volume is made up of voxels (volume elements). An axis 36 (FIG. 1) approximately perpendicular to plane 34 containing the camera viewpoints defines a scan direction. The scene volume is scanned beginning with the layer of voxels along axis 36 closest to plane 34. The algorithm then progresses to layers of voxels along axis 36 at successively greater distances from plane 34. Each voxel V is processed individually. The processing of a voxel is described below, and the process is repeated for each voxel in the order described above.

For each input image i, a set $P_i$ of pixels in the projection of voxel V is found. For all not-occluded pixels in the sets $P_i$ of pixels, the colors of the pixels are added to a color-mean variable and a color-standard-deviation variable. The color-mean variable represents the average color of the pixels in the projections of voxel V. The color-standard-deviation variable is a measure of the variation in color in the sets of pixels corresponding to voxel V across all images. The computed color-standard-deviation value is compared with a coloring threshold that is fixed in the prior art voxel coloring algorithm. If the color-standard-deviation value is less than the coloring threshold, indicating that the colors match in different projections of voxel V, then voxel V is marked as opaque and its color is set as the computed color-mean value. Thus, the voxel color is set to the average color in the projections of voxel V. Where the voxel V is marked as opaque, the pixels in the sets $P_i$ of pixels for each image i are set to occluded in the occlusion bitmap for that image. Setting of pixels as occluded in the occlusion bitmap is representative of the fact that the opaque voxel will block or occlude the view of other voxels from the camera viewpoint. If the color-standard-deviation value is not less than the coloring threshold, the voxel V is marked as transparent. A transparent voxel is typically an empty portion of the scene. A relatively large value of color-standard-deviation indicates that the colors of the pixels corresponding to the voxel in the different images do not match, as might be expected when an empty volume is viewed from different directions.

As indicated above, each voxel is processed along axis 36 starting closest to the camera viewpoints and progressing away from the camera viewpoints. Additional details regarding the prior art voxel coloring algorithm are disclosed in the aforementioned article by Seitz et al., which is hereby incorporated by reference.

Figure 3:
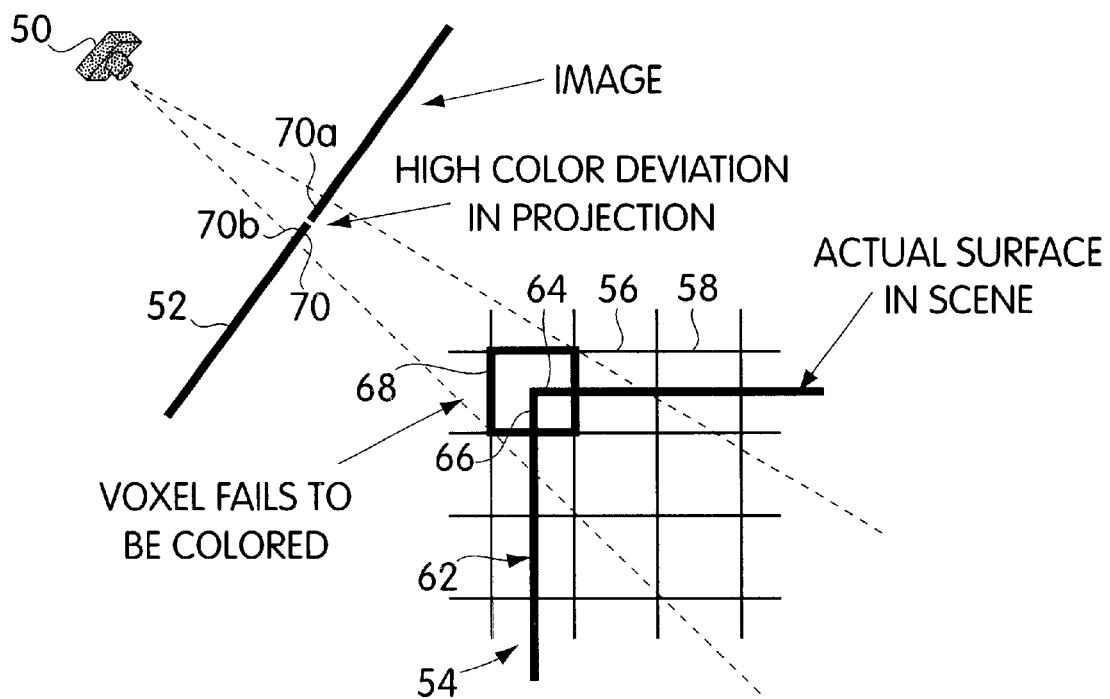
FIG. 3 is a schematic diagram that illustrates voxel coloring at the edge of an object in a scene.

A problem with the prior art voxel coloring algorithm is described with reference to FIG. 3. A camera 50 obtains an image 52 of a scene 54. A pattern of voxels 56, 58, etc. is superimposed on scene 54. An object 62 includes a surface 64, which may be blue, and a surface 66, which may be red. The boundary between blue surface 64 and red surface 66 occurs in a voxel 68. A projection 70 of voxel 68 on image 52 includes a blue region 70a and a red region 70b, and therefore exhibits a high color standard deviation. The high color standard deviation of voxel 68 is likely to exceed a fixed coloring threshold. Thus, voxel 68 is marked as transparent despite the fact that it contains object 62. This error is likely to propagate in the reconstruction of the three-dimensional model of the scene, because the occlusion bitmap is not set when the voxel is erroneously marked as transparent. A similar problem occurs when a voxel contains the edge of an object, and the projection of the voxel therefore exhibits a high color standard deviation.

An improved voxel coloring algorithm which overcomes the above-described problem and provides improved image quality is now described. FIG. 4 shows an example of pseudo code for the improved voxel coloring algorithm. The improved voxel coloring algorithm may utilize the same input images that were utilized in the prior art voxel coloring algorithm. Initially, the occlusion bits in the occlusion bitmaps for all images are set to not-occluded, thus clearing all occlusion bitmaps. A scene volume containing a set of voxels which include the scene of interest is established. The major axis 36 perpendicular to the plane 34 of camera viewpoints is defined. The voxels are processed beginning with the layer of voxels along the major axis 36 closest to the camera viewpoints. The voxels are processed individually beginning with the voxels closest to the camera viewpoints and progressing away from the camera viewpoints.

A voxel V is projected into each of the images i, and a set $P_i$ of pixels that corresponds to the projection of voxel V is found for each image. For each pixel P in the set $P_i$ of not-occluded pixels for each image, the following operations are performed: (1) the color of pixel P is added to a color-mean variable; (2) the color of pixel P is added to a color-standard-deviation-all-images variable; and (3) the color of pixel P is added to a color-standard-deviation-this-image variable. The color-mean and the color-standard-deviation-all-images variables are determined across all images, whereas the color-standard-deviation-this-image variable is determined for each individual image. Following completion of these operations for each image, the color-standard-deviation-this-image value is added to a mean-standard-deviation-individual-images variable. A coloring threshold T is then defined as $k_1$*mean-standard-deviation-individual-images+$k_2$, where $k_1$ and $k_2$ are constants that may be adjusted for improved image quality. More generally, the coloring threshold may be a linear or nonlinear nondecreasing function of the color variation in the individual projections of the voxel. The term "nondecreasing" refers to the fact that the coloring threshold increases or remains constant as the color variation in the individual projections increases. Next the color-standard-deviation-all-images value is compared with the coloring threshold. If the color-standard-deviation-all-images value is less than the coloring threshold, voxel V is marked as opaque and is colored with the value of the color-mean variable. Where the voxel V is marked as opaque, the pixels in the set $P_i$ are set to occluded in the occlusion bitmap for each image. If the color-standard-deviation-all-images value is not less than the coloring threshold, the voxel is marked as transparent. The voxel processing is repeated for each voxel in the scene volume as described above.

In contrast to the prior art voxel coloring algorithm, which uses a fixed coloring threshold, the improved voxel coloring algorithm of the present invention adaptively adjusts the coloring threshold through a continuum of values. For portions of a scene that have high color variation, the threshold is increased, thereby allowing surface voxels to be colored. In areas of the scene with low color variation, the threshold is lowered, thereby increasing the sensitivity to subtle detail. The standard color deviation is calculated for the projection of the voxel in each individual image, and the mean is calculated across all these values for the individual images. The adaptive coloring threshold is preferably set proportional to the mean.

The improved voxel coloring algorithm of the present invention has been described as an improvement to the voxel coloring algorithm shown in FIG. 2 and described in the article by Seitz et al. It will be understood that the improved voxel coloring algorithm of the present invention can be applied to variations, extensions and improvements of the prior art voxel coloring algorithm. More generally, the improved voxel coloring algorithm of the present invention can be applied to any technique that relies upon color consistency, wherein a point on a surface projects into the same or a similar color in the input images, for voxel coloring.

Figure 5:
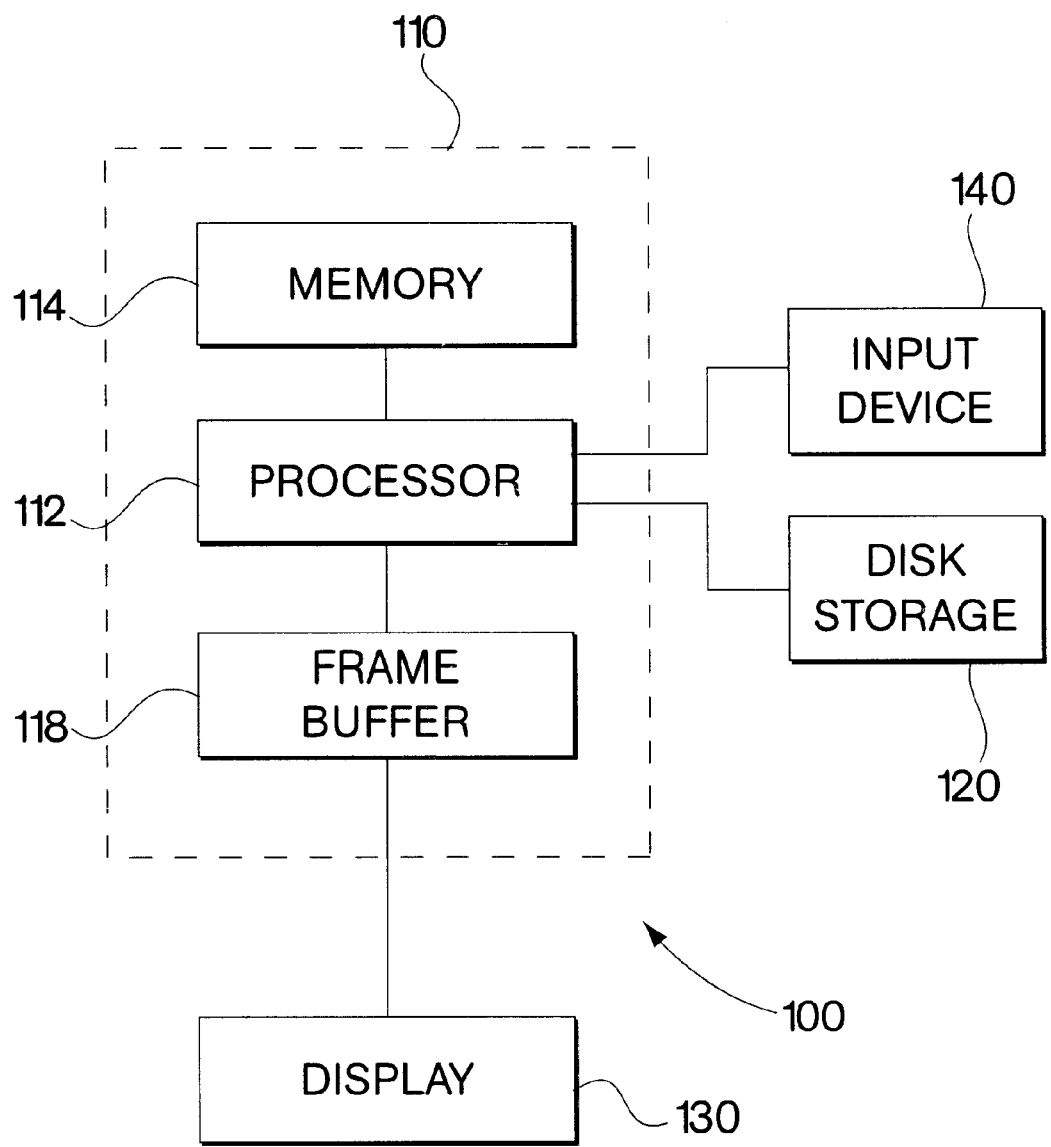
FIG. 5 is a block diagram of an example of a hardware configuration for implementing the present invention.

A block diagram of an example of a computer system 100 suitable for reconstructing a three-dimensional model of a scene from a plurality of input images of the scene taken from different viewpoints is shown in FIG. 5. The computer system 100 includes a central processing unit (CPU) 100, a disk storage unit 120, a display 130 and an input device 140. The disk storage unit 120 is typically implemented using one or more hard disk drives. The input images for reconstructing the three-dimensional model of the scene may be stored in disk storage unit 120. The input device 140 may be implemented using a standard keyboard and a pointing device, such as a mouse or a trackball.

The CPU 110 may include a processor 112, a memory 114 and a frame buffer 118 for storing an image to be displayed on the display 130. The processor 112 provides the primary processing capabilities of the computer system 100 and, for example, may be implemented using a model HP 9000/J282, manufactured by Hewlett-Packard Company. The memory 114 is used for storage of program instructions and for storage of results of calculations performed by the processor 112. In a preferred embodiment, the memory includes 200 or more megabytes of RAM. The frame buffer 118 is a high speed buffer memory device capable of storing one frame of data for the display 130. The software routines for performing reconstruction of a three-dimensional model of a scene in accordance with the invention may be implemented using the "C" programming language and may reside in memory 114 and/or disk storage unit 120. The computer program for reconstructing of a three-dimensional model of a scene in accordance with the invention may be stored on a computer-readable medium, such as magnetic disk, compact disk or magnetic tape, and may be loaded into the computer system 100 using an appropriate peripheral device, as known in the art. It will be understood that the hardware components identified above are given by way of example only and that the invention may be implemented in a variety of different computer systems.

To judge the effectiveness of the improved voxel coloring algorithm of the invention, a measure of the fidelity of a reconstruction was developed. One image from the input image set was not used in the reconstruction. After reconstruction, the new model of the scene is projected to the exact viewpoint and orientation of the unused image. This allows the new, synthetic image to be compared, pixel for pixel, with the unused image and an RMS error to be calculated. In experiments with several scenes, improvements between 7.2% and 30.2% were observed with the voxel coloring algorithm of the present invention as compared with the prior art voxel coloring algorithm.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A method for reconstructing a three-dimensional model of a scene from a plurality of images of the scene taken from different viewpoints, comprising the steps of:
   defining a set of voxels that include the scene; and
   processing the voxels in the set of voxels beginning with voxels that are closest to the viewpoints and progressing away from the viewpoints, the processing of each voxel comprising:
      projecting the voxel onto a set of pixels in each of the images;
      determining a first color variation of not-occluded pixels in the sets of pixels across the plurality of images;
      determining a second color variation of not-occluded pixels across the set of pixels for each individual image;
      determining a mean of the second color variations across the plurality of images;
      establishing a coloring threshold for the voxel that is a function of said mean; and
      if the first color variation is less than the coloring threshold, coloring the voxel, else leaving the voxel transparent.

2. A method for reconstructing a three-dimensional model as defined in claim 1, wherein the step of determining a first color variation comprises determining a color standard deviation across the plurality of images.

3. A method for reconstructing a three-dimensional model as defined in claim 1, wherein the step of determining a second color variation comprises determining a color standard deviation for each individual image.

4. A method for reconstructing a three-dimensional model as defined in claim 1, wherein the step of establishing a coloring threshold comprises establishing a coloring threshold that is a linear function of said mean.

5. A method for reconstructing a three-dimensional model as defined in claim 1, wherein the step of establishing a coloring threshold comprises establishing a coloring threshold that is defined as $k_1$*mean of the second color variations+$k_2$, where $k_1$ and $k_2$ are constants.

6. A method for reconstructing a three-dimensional model as defined in claim 1, wherein the processing of each voxel further comprises setting bits in an occlusion bitmap corresponding to the sets of pixels in said plurality of images when the voxel is colored.

7. A method for reconstructing a three-dimensional model as defined in claim 1, wherein the processing of each voxel further comprises determining a color mean of the sets of pixels in said plurality of images and wherein the step of coloring the voxel comprises setting the voxel color to said color mean.

8. A method for reconstructing a three-dimensional model of a scene from a plurality of images of the scene taken from different viewpoints, comprising the steps of;

defining a set of voxels that include the scene; and
  processing each of the voxels in the set of voxels, the processing of each voxel comprising;
    projecting the voxel onto a set of pixels in each of the images;
    determining a first color standard deviation of not-occluded pixels in the sets of pixels across the plurality of images;
    determining a second color standard deviation of not-occluded pixels across the set of pixels for each individual image;
    determining a mean of the second color standard deviations across the plurality images;
    establishing a coloring threshold for the voxel that is proportional to said mean; and
    if the first color standard deviation is less than the coloring threshold, coloring the voxel, else leaving the voxel transparent.

9. A method for reconstructing a three-dimensional model as defined in claim 8, wherein the processing of each voxel further comprises determining a color mean of the sets of pixels in said plurality of images and wherein the step of coloring the voxel comprises setting the voxel color to said color mean.

10. Apparatus for reconstructing a three-dimensional model of a scene from a plurality of images of the scene taken from different viewpoints, comprising:

a storage unit for storing image data representative of the plurality of images of the scene; and
  a digital computer for processing the image data in said storage unit, said digital computer comprising: means for defining a set of voxels that include the scene; and means for processing the voxels in the set of voxels beginning with the voxels that are closest to the viewpoints and progressing away from the viewpoints, said means for processing comprising:
    means for projecting a voxel onto a set of pixels in each of the images;
    means for determining a first color variation of not-occluded pixels in the sets of pixels across the plurality of images;
    means for determining a second color variation of not-occluded pixels across the sets of pixels for each individual image;
    means for determining a mean of the second color variations across the plurality of images;
    means for establishing a coloring threshold for the voxel that is a function of said mean; and
    means for coloring the voxel if the first color variation is less than the coloring threshold, else leaving the voxel transparent.

11. Apparatus for reconstructing a three-dimensional model as defined in claim 10, wherein said means for establishing a coloring threshold comprises means for establishing a coloring threshold that is a linear function of said mean.

* * * * *